(12) United States Patent
Langer et al.

(10) Patent No.: US 8,991,530 B2
(45) Date of Patent: Mar. 31, 2015

(54) ELECTRICALLY DRIVEN AXLE OF A TWO-TRACK VEHICLE

(71) Applicant: Bayerische Motoren Werke Aktiengesellschaft, Munich (DE)

(72) Inventors: Juergen Langer, Mammendorf (DE); Tobias Lorenz, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/874,810

(22) Filed: May 1, 2013

(65) Prior Publication Data

US 2013/0240273 A1 Sep. 19, 2013

Related U.S. Application Data

(63) Continuation of application No. PCT/EP2011/067760, filed on Oct. 12, 2011.

(30) Foreign Application Priority Data

Nov. 15, 2010 (DE) .................. 10 2010 043 901

(51) Int. Cl.
*B60K 1/02* (2006.01)
*B60K 1/00* (2006.01)
(Continued)

(52) U.S. Cl.
CPC ... *B60K 1/02* (2013.01); *B60K 1/00* (2013.01); *B60K 1/04* (2013.01); *H01M 2/1083* (2013.01);
(Continued)

(58) Field of Classification Search
CPC ........................................... B60K 7/00

USPC ............. 180/65.1, 65.51, 65.6, 68.5, 312, 55, 180/56, 58, 60, 62, 299, 300
See application file for complete search history.

(56) References Cited

U.S. PATENT DOCUMENTS 3,842,928 A 10/1974 Kishi
5,829,542 A * 11/1998 Lutz ............................ 180/65.6
(Continued)

FOREIGN PATENT DOCUMENTS

DE 2 234 032 2/1973
DE 35 43 010 A1 6/1987
(Continued)

OTHER PUBLICATIONS

Peugeot 3008 Hybrid4 2013 Introduction, Mar. 2, 2010, URL:http//Peugeot.3008.free.fr/FR/PEUGEOT_3008_HYBRID4_2013/index.php (Nine (9) pages).
(Continued)

*Primary Examiner* — John Walters
*Assistant Examiner* — Brian Swenson
(74) *Attorney, Agent, or Firm* — Crowell & Moring LLP

(57) ABSTRACT

An electrically driven axle of a two-track vehicle is provided having drive shafts which are assigned to the wheels and an axle carrier with a plurality of wheel-guiding steering arms which are attached thereto. At least one electric motor is attached to the axle carrier, and furthermore a housing containing elements for making available electrical energy for the electric motor is attached to the axle carrier or forms a component of the axle carrier in the form of a base body. At least one of the wheel-guiding steering arms is connected to the base body or housing, and arms extend from the base body of the axle carrier, on the end regions of which arms the vehicle body is supported via rubber bearings. The underfloor of the base body or housing facing the roadway is preferably essentially planar.

12 Claims, 2 Drawing Sheets

(51) Int. Cl.
*B60K 1/04* (2006.01)
*H01M 2/10* (2006.01)
*B60K 7/00* (2006.01)

(52) U.S. Cl.
CPC ......... *B60K 7/0007* (2013.01); *B60K 2001/001* (2013.01); *B60K 2001/0416* (2013.01); *B60K 2001/0438* (2013.01)
USPC ............................. 180/65.1; 180/312; 180/60

(56) References Cited

U.S. PATENT DOCUMENTS

| | | | |
|---|---|---|---|
| 5,921,338 A * | 7/1999 | Edmondson | 180/65.51 |
| 7,030,526 B2 * | 4/2006 | Tsukamoto et al. | 310/90 |
| 7,159,677 B1 * | 1/2007 | Lam et al. | 180/65.51 |
| 7,326,141 B2 * | 2/2008 | Lyons et al. | 475/28 |
| 7,363,995 B2 * | 4/2008 | Downs et al. | 180/65.1 |
| 7,703,565 B2 * | 4/2010 | Ikenoya et al. | 180/65.51 |
| 7,886,861 B2 * | 2/2011 | Nozaki et al. | 180/232 |
| 8,240,414 B2 * | 8/2012 | Sasahara et al. | 180/65.31 |
| 2003/0230443 A1 * | 12/2003 | Cramer et al. | 180/65.5 |
| 2005/0263332 A1 * | 12/2005 | Chernoff et al. | 180/65.1 |
| 2007/0068715 A1 * | 3/2007 | Mizutani et al. | 180/65.5 |
| 2009/0014223 A1 * | 1/2009 | Jones et al. | 180/65.8 |
| 2010/0025131 A1 * | 2/2010 | Gloceri et al. | 180/65.28 |
| 2010/0108417 A1 * | 5/2010 | Gilmore | 180/65.51 |
| 2012/0305322 A1 * | 12/2012 | Schaal | 180/65.1 |

FOREIGN PATENT DOCUMENTS

| | | |
|---|---|---|
| DE | 37 25 620 A1 | 2/1989 |
| DE | 42 43 455 A1 | 6/1994 |
| DE | 44 21 425 C1 | 8/1995 |
| DE | 698 14 720 T2 | 11/2003 |
| DE | 10 2007 039 058 A1 | 2/2009 |
| DE | 10 2009 002 440 A1 | 10/2010 |
| DE | 10 2010 023 982 A1 | 2/2011 |
| DE | 10 2009 047 007 A1 | 5/2011 |
| DE | 102010017991 A1 * | 10/2011 |
| FR | 2 691 930 A1 | 12/1993 |
| JP | 5-201354 A | 8/1993 |
| WO | WO 2007/118082 A2 | 10/2007 |

OTHER PUBLICATIONS

International Search Report with English translation dated Apr. 5, 2012 (Four (4) pages).
German Search Report with English translation dated Jul. 6, 2011 (Ten (10) pages).

* cited by examiner

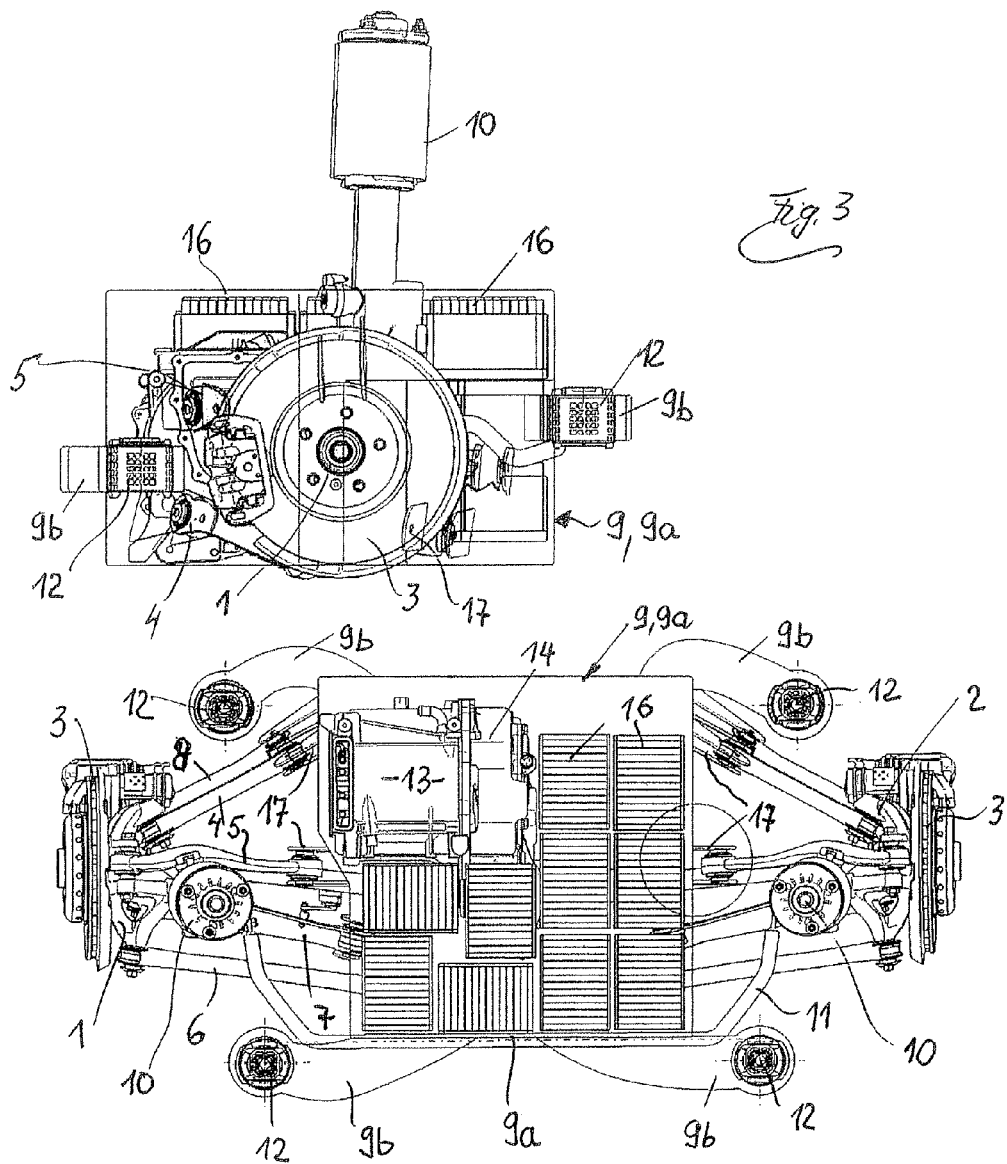

_US 8,991,530 B2_

ELECTRICALLY DRIVEN AXLE OF A TWO-TRACK VEHICLE

CROSS REFERENCE TO RELATED APPLICATIONS

This application is a continuation of PCT International Application No. PCT/PCT/EP2011/067760, filed Oct. 12, 2011, which claims priority under 35 U.S.C. §119 from German Patent Application No. 10 2010 043 901.0, filed Nov. 15, 2010, the entire disclosures of which are herein expressly incorporated by reference.

BACKGROUND AND SUMMARY OF THE INVENTION

The invention relates to an electrically driven axle of a two-track vehicle having drive shafts which are assigned to the wheels and an axle carrier with a plurality of wheel-guiding control members fastened thereto. With respect to the state of the art, reference is made, for example, to German Patent document DE 44 21 425 C1.

Two-track vehicles, particularly passenger cars, which are driven either solely, or as an alternative to an internal-combustion engine, by an electric motor, are becoming increasingly important. For this purpose, investigations are taking place for simple axle concepts which not only simplify the manufacturing process of the vehicle but, in particular, also make it possible in a simple manner to optionally equip a vehicle body with different axle concepts, of which, for example, only one permits an electric vehicle drive while another axle concept may be provided for a different power source.

It is an object of the invention to provide a unique axle concept for an electric drive of a vehicle.

According to the present invention, an electrically driven axle of a two-track vehicle is provided with drive shafts assigned to the wheels and an axle carrier having a plurality of wheel-guiding control members fastened thereto. At least one electric motor is fastened to the axle carrier. Furthermore, a housing containing elements for providing electric power for the electric motor is fastened to the axle carrier or forms a component of the axle carrier in the shape of a base body.

According to the invention, not only one electric motor—if the latter drives the drive shafts of both wheels by way of a series connection of a power divider or differential—, or two electric motors—if an independent motor is assigned to each vehicle wheel—, is/are fastened to the axle carrier, but also a so-called unit for providing electric power to the above-mentioned electric motor(s). Since a vehicle axle normally represents a preassembled unit which, in the manufacturing process of a vehicle, is first completed away from the vehicle body before the axle is fitted to the vehicle body, by use of an axle according to the invention, the essential elements required for the electric drive can not only be preassembled in a cohesive manner and can be tested with respect to their mutual interaction before the mounting on the vehicle body, but can also be cohesively connected with the vehicle body that is still preassembled separately. This leads to a particularly efficient manufacturing process. As far as the cohesive preassembling is concerned, particularly also the electric arrangement of the wiring between the above-mentioned unit for providing electric power and the electric motor or motors can be preassembled on an axle according to the invention, so that, during the joining with the vehicle body, no high-expenditure line installation (especially of lines carrying high electric currents) has to be carried out.

The above-mentioned unit for providing electric power can basically have various constructions. In the simplest case, this unit essentially consists of accumulators for storing electric power; in the most complex case, this unit may comprise a fuel cell with assigned accumulators. Here, the so-called electronic power system assigned to the accumulators is also a component of the above-mentioned unit and, if elements are required for temperature control, particularly the cooling of the accumulators and/or of the electronic power system, preferably these elements are also included in the "elements for providing electric power" as claimed herein.

Furthermore, it may be advantageous to arrange the above-mentioned elements for providing electric power inside a housing, and therefore in a manner protected from environmental influences by the housing. Naturally, this applies to only those elements for which such a protected arrangement makes sense. For example, a heat exchanger for cooling a heat transfer medium by ambient air, by which a temperature control of an element for providing electric power takes place, is not included in the above-mentioned elements. The above-indicated housing is fastened to at least one appropriately designed axle carrier basically known to a person skilled in the field of chassis design. However, it is particularly advantageous for this housing to virtually be a component of an axle carrier, on which the wheel-guiding control members or some of the members are fastened in a basically known manner. The above-mentioned housing is therefore structurally integrated in the axle carrier and may, thereby, form a so-called "base body" of the axle carrier, and advantageously, can be additionally functionally integrated in the axle carrier in that at least one of the wheel-guiding control members is linked to the above-mentioned housing or base body. Furthermore, similar to the known axle carriers, so-called arms (preferably four each) may be provided on the above-mentioned base body, the vehicle body being supported on end regions of the arms by way of rubber bearings.

Particularly advantageously, the above-mentioned housing can also contribute to the reduction of the drag coefficient of the vehicle; specifically, if the underfloor of the axle carrier facing the road with the above-mentioned housing is constructed to be essentially planar, which can be provided relatively easily with an appropriate housing wall.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a lateral view of the embodiment of FIG. 1;
and
FIG. 4 is a top view of the embodiment of FIG. 1.

DETAILED DESCRIPTION OF THE DRAWINGS

Figure 1:
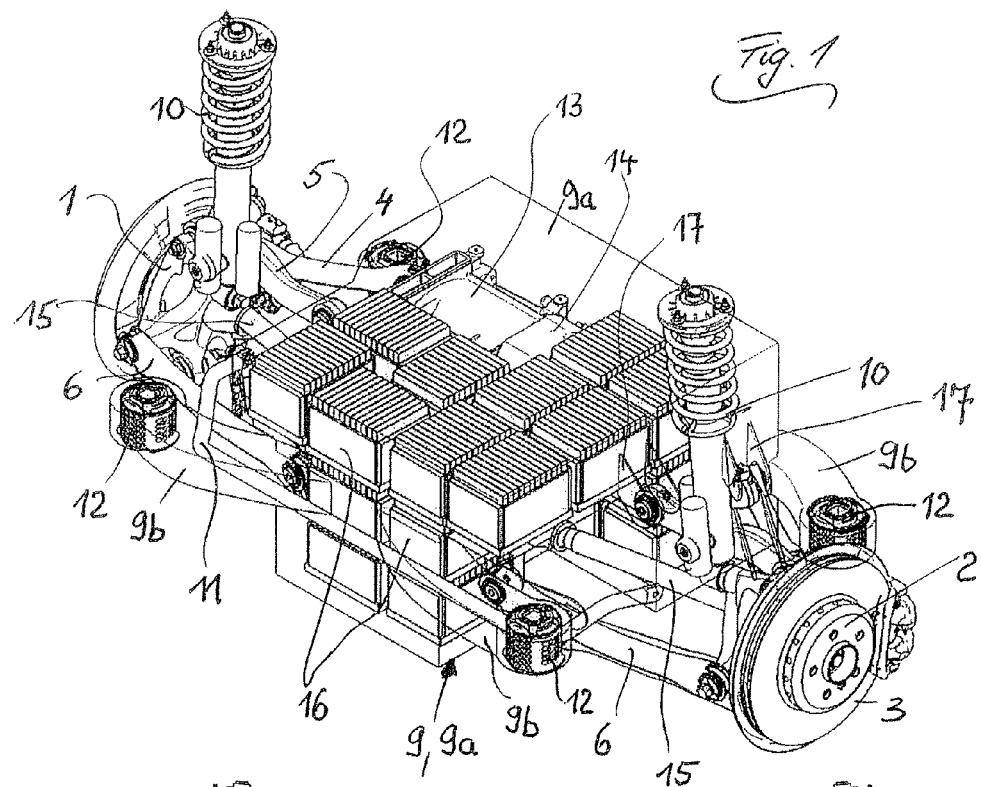
FIG. 1 is a perspective view of an embodiment according to the invention.

In the drawings, the housing is illustrated in a very simplified and transparent manner, and the elements for providing electric power accommodated therein are illustrated only abstractly. Other components illustrated in the figures are partly also illustrated in a transparent fashion in order to be able to better recognize the basic construction.

Reference number 1 indicates a wheel carrier of the rear wheel that is on the left when viewed in the driving direction; and reference number 2 indicates the wheel carrier of the right rear wheel of a passenger car, which is equipped with an axle according to the invention, in this case, with a rear axle according to the invention. In a conventional manner, a wheel (not shown) is mounted on each wheel carrier 1, 2, for which wheel the reference number 1 or 2 respectively will also be used in the following description. The figures also show a brake disk 3 connected with the respective wheel 1, 2. As is customary, each wheel 1, 2 is guided by control members, in the present embodiment, by five control members 4, 5, 6, 7, 8. With their ends facing away from the wheel carrier 1 and 2, respectively, the control members 4-8 are linked to an axle carrier 9 in a basically known manner. Furthermore, in this case, a spring damper strut 10 is supported on suitably designed wheel carriers 1 and 2 respectively. On the upper end of the spring damper strut 10, the vehicle body (which is not shown) is supported. Finally, a customary stabilizer bar 11 is also shown.

The axle carrier 9 is formed by an approximately cuboid-shaped base body 9a constructed as a housing, arms 9b extending from this base body 9a approximately in corner regions (viewed in the driving direction, the left front, the right front, the left rear and the right rear). Rubber bearings 12 are provided in a known manner in the ends of the arms 9b, by way of which rubber bearings 12, the vehicle body is supported on the axle carrier 9.

With these arms 9b, which are illustrated in a virtually transparent manner in the figures, the axle carrier 9, as basically customary, has a frame-type construction. The housing-type construction of the base body 9a provides the latter with high mechanical stability. In particular, in addition to the above-mentioned four arms 9b, the wheel-guiding control members 4-8 assigned to each wheel 1,2 are also fastened to the base body 9a or to the walls of the housing forming this base body 9a. For this purpose, lugs 17 are mounted on the housing or base body, for example, by being welded onto the walls of the above-mentioned housing or base body, to which, with the series connection of rubber bearings, the above-mentioned wheel-guiding control members 4-8 are fastened in a customary manner with their end facing away from the respective wheel carrier 1, 2. For reasons of clarity, only a few of the lugs 17 are provided with reference numbers in the figures.

Figure 2:
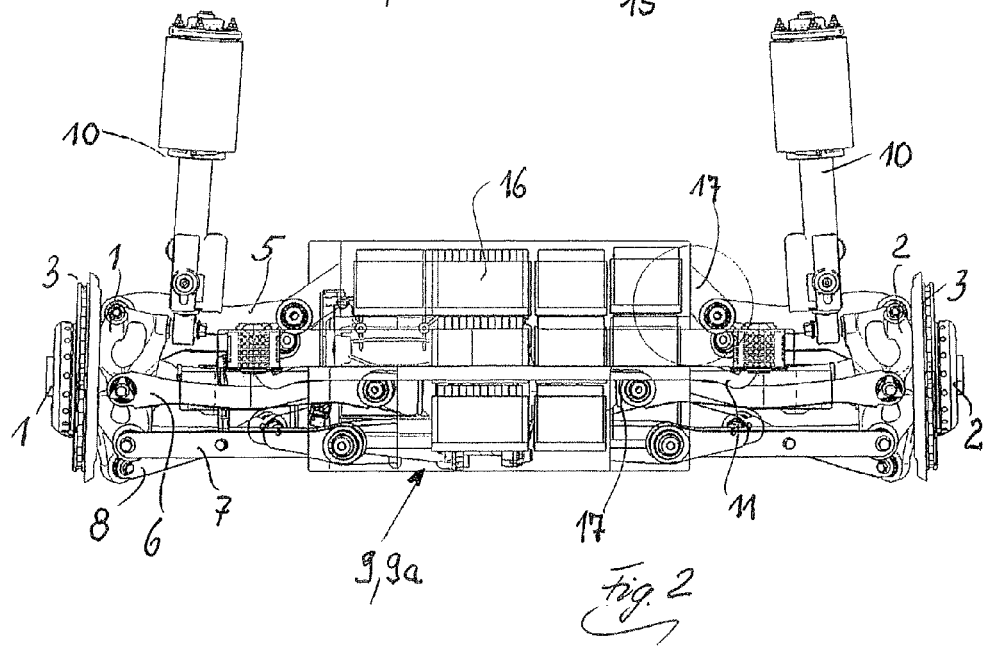
FIG. 2 is a rear view of the embodiment of FIG. 1.

An electric motor 13 is fastened to the base body 9a of the axle carrier 9, or this electric motor 13, having a power divider 14 with a differential flanged to the output side of the electric motor 13, may partially or completely be arranged within the housing of the base body 9a of the axle carrier 9. From the output of the power divider 14 (not visible in the figures), one drive shaft 15 respectively leads to a wheel carrier 1 or 2 or to the hub of the wheel 1 or 2 carried by the latter. These drive shafts 15 are visible only in FIG. 1; in FIGS. 2, 4, they are covered by control members.

However, particularly the elements 16 for providing electric power to the electric motor 13, which were mentioned at the outset herein, are arranged inside the housing of the base body 9a of the axle carrier 9. These elements 16 will then be protected from harmful environmental influences, and, as mentioned above, such an axle can form an advantageous preassembled unit. A further advantage of such an axle consists of the large acoustic barrier mass formed by the base body 9a designed as a housing with the elements 16 arranged therein, the electric motor 13 and the power divider 14. This barrier mass has the effect of limiting annoying vibrations mostly to only those that may pass through the rubber bearings 12 in the vehicle body supported by the axle carrier 9.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrically driven axle of a two-track vehicle, comprising:
   drive shafts respectively assigned to wheels of the vehicle;
   an axle carrier housing comprising a base and a cover;
   a plurality of wheel-guiding control members fastened to the axle carrier housing;
   at least one electric motor fastened to the base of the axle carrier housing; and
   an energy storage device configured to provide electric power to the at least one electric motor, the energy storage device being disposed within the axle carrier housing; and
   arms that extend from the base of the axle carrier housing, wherein
      end regions of the arms support a vehicle body via rubber bearings, and
      the axle carrier housing creates a sealed enclosure that isolates the at least one electric motor and the energy storage device from other parts of the vehicle.

2. The electrically driven axle according to claim 1, wherein an assigned electric motor is provided for each wheel.

3. The electrically driven axle according to claim 1, wherein only one electric motor is fastened to the base of the axle carrier housing, the one electric motor having a power divider or differential connected on an output side for driving two drive shafts.

4. The electrically driven axle according to claim 1, wherein an underside of the base of the axle carrier housing that faces a roadway is configured essentially planar.

5. An electrically driven axle of a two-track vehicle, comprising:
   drive shafts respectively assigned to wheels of the vehicle;
   a housing that encloses therewithin at least one electric motor;
   a plurality of wheel-guiding control members fastened to the housing; and
   an energy storage device that is enclosed within the housing, wherein
      the housing creates a sealed enclosure that isolates the at least one electric motor and the energy storage device from other parts of the vehicle.

6. The electrically driven axle according to claim 5, wherein the housing has a substantially cuboidal shape.

7. The electrically driven axle according to claim 6, wherein the electric motor and the energy storage device are substantially horizontally coplanar.

8. The electrically driven axle according to claim 7, wherein the electric motor is offset from an imaginary line connecting the drive shafts.

9. The electrically driven axle according to claim 5, wherein an assigned electric motor is provided for each wheel.

10. The electrically driven axle according to claim 5, wherein only one electric motor is enclosed within the housing, the one electric motor having a power divider or differential connected on an output side for driving two drive shafts.

11. The electrically driven axle according to claim 5, further comprising arms that extend from the housing, end regions of the arms supporting a vehicle body via rubber bearings.

12. The electrically driven axle according to claim 5, wherein an underside of the housing that faces a roadway is configured essentially planar.

\* \* \* \* \*